May 23, 1967 R. VERARDO 3,320,989
BROCCOLI BUNCHING AND TRIMMING APPARATUS
Filed Aug. 19, 1963 2 Sheets-Sheet 1

INVENTOR.
RICCARDO VERARDO
BY Edward P. Gregg
ATTORNEY

May 23, 1967

R. VERARDO 3,320,989

BROCCOLI BUNCHING AND TRIMMING APPARATUS

Filed Aug. 19, 1963

INVENTOR.
RICCARDO VERARDO
BY
*Edward B. Gregg*
ATTORNEY

United States Patent Office 3,320,989
Patented May 23, 1967

3,320,989
BROCCOLI BUNCHING AND TRIMMING
APPARATUS
Riccardo Verardo, Castroville, Calif., assignor to D'Arrigo
Bros. Co. of California, Salinas, Calif., a corporation
of California
Filed Aug. 19, 1963, Ser. No. 302,948
9 Claims. (Cl. 146—82)

This application relates to a vegetable bunching and trimming apparatus and more particularly to such an apparatus which grips into a bunch a plurality of stalks of vegetables in preparation for tying, and includes means for trimming or cutting off the ends of the bunched stalks.

In marketing of fresh vegetables, such as broccoli, asparagus and the like in which an edible portion includes stalks or shoots, it is common practice to tie a plurality of such stalks or shoots together in a bunch. To facilitate packing, shipping and handling the bunches are preferably trimmed to substantially uniformed length. Such bunching, trimming and tying operation of the vegetables must be performed promptly and expeditiously after picking thereof, if the vegetables are to be delivered to the consumer in a fresh state.

An object of this invention is the provision of an improved apparatus for bunching together stalks or shoots of vegetables into condition for tying in the preparation of the vegetables for marketing.

An object of this invention is the provision of a semi-automatic vegetable bunching and trimming machine by means of which an operator may easily and readily bunch and tie together shoots or stalks of vegetables, such as broccoli, which machine also trims the ends of the stalks, the trimmed and bunched stalks being delivered from the machine in preparation for packing and shipping.

An object of this invention is the provision of a semi-automatic vegetable bunching, tying and trimming machine.

An object of this invention is the provision of a broccoli bunching and trimming machine in which a gripper member for bunching and a knife for trimming are operated substantially simultaneously thereby bunching and trimming the stalks substantially simultaneously to reduce the time required for such operation to a minimum.

An object of this invention is the provision of a broccoli bunching and trimming apparatus which includes two control levers for actuating valves, one of which controls the power operating means for both a gripping and cutting mechanism and the other of which controls the power operating means for a bunch release mechanism, which valve control levers are closely spaced for ease of foot operation by the operator with a minimum of effort and lost motion.

These and other objects and advantages are obtained by means of a movable trough which operates between a bunch supporting position and a bunch release position. In use, an operator places a tie or ties and a wrapper, if desired, across the trough and a plurality of stalks of vegetables thereon. A power operated movable gripper member of a generally semi-cylindrical shape is included for clamping the stalks together in a bunch on the trough. Simultaneously, a movable cutter knife is actuated to trim the ends of the stalks as they are bunched together. The operator then twists the ties together to contain the stalks in a bunch. The valve controlling the gripper member and knife is then closed whereupon the gripper member and knife return to a normal position. The operator, with the same movement required to release such valve, opens a second valve for actuation of the trough to a bunch release position whereupon the bunched vegetables drop from the trough. Unlike fully automatic bunching machines, the apparatus of this invention may be stopped during operation and restarted. Thus, for example, if an incorrect number or grade of stalks is placed in the apparatus, correction can be made by the operator before tying the stalks together in a bunch.

In the drawings wherein like reference characters refer to the same parts in the several views.

Figures 1, 2:
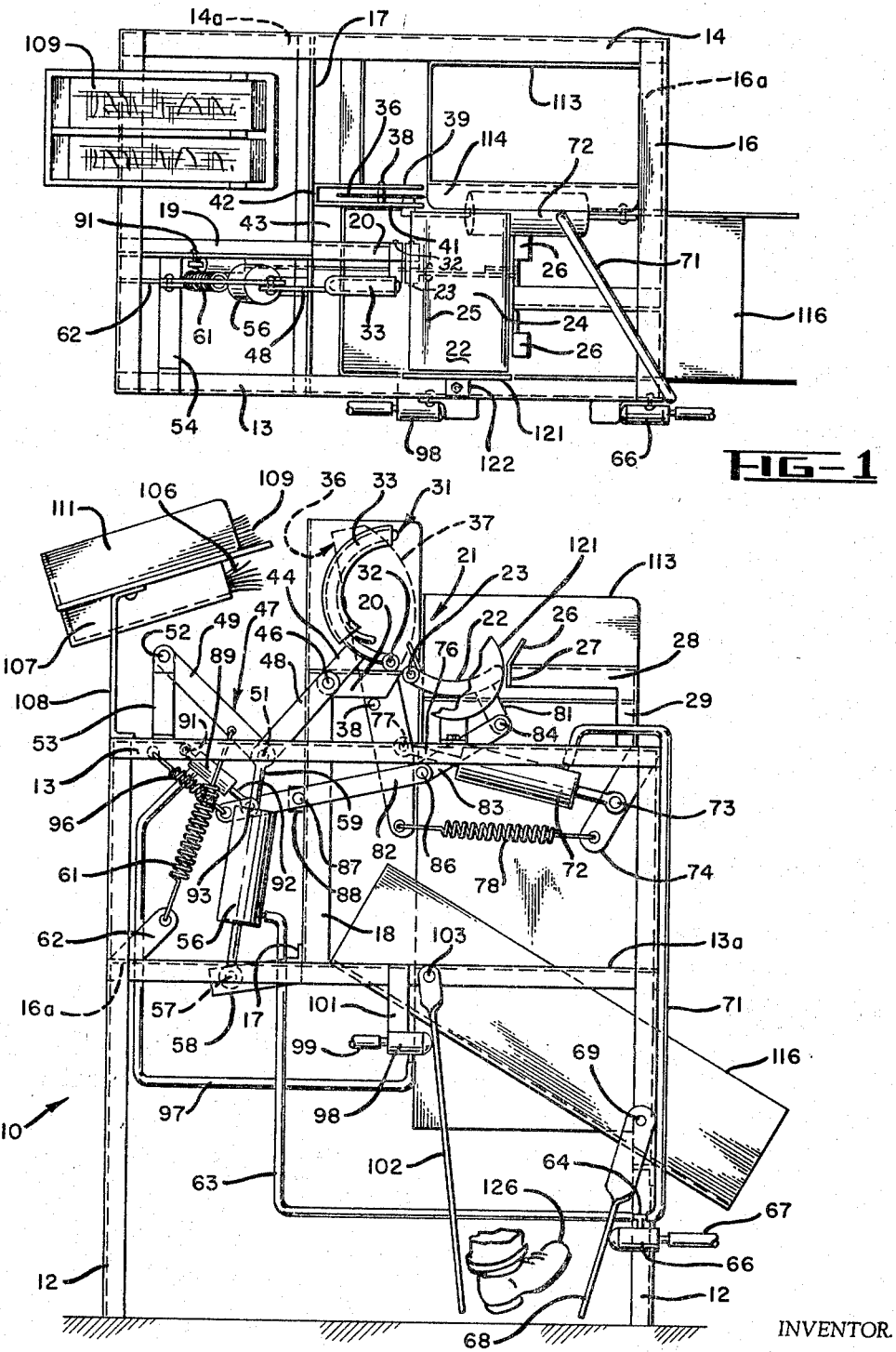
FIGURE 1 is a top plan view of a vegetable bunching and trimming machine.
FIGURE 2 is a front elevational view of the machine shown in FIGURE 1.
Figure 3:
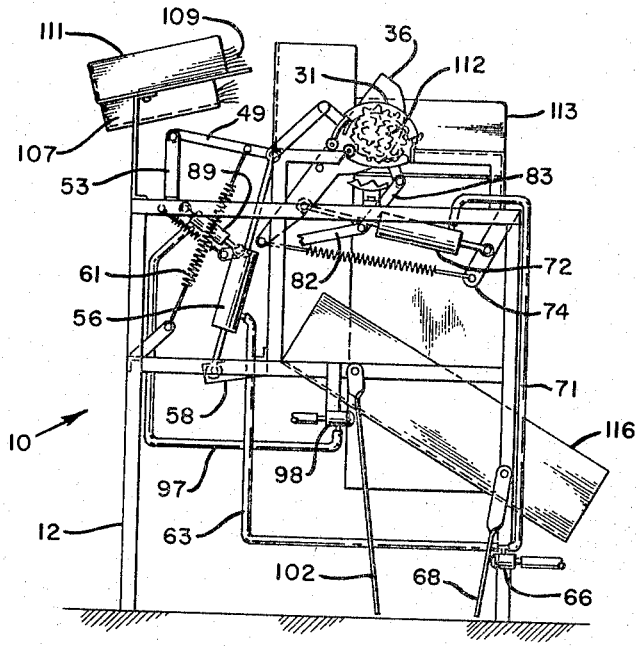
Figure 4:
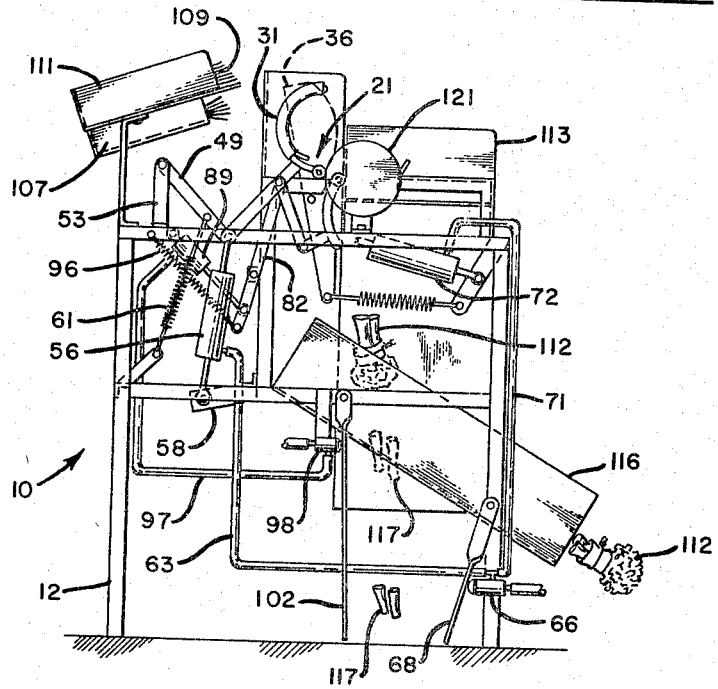

And FIGURES 3 and 4 are similar to FIGURE 2 only showing the machine in different operating conditions.

Reference is now made to the drawings wherein there is shown a bunching and trimming apparatus designated generally by the reference numeral 10, which apparatus is constructed in accordance with this invention. Although the apparatus will be described for use with broccoli, it will be understood that it is not so limited and may be used in the bunching and trimming of other vegetables, such as asparagus and the like. The apparatus includes a frame 10 comprising vertical legs 12 interconnected by horizontal front members 13 and 13a, rear members 14 and 14a and side members 16 and 16a, at both the upper ends of the legs and at a point intermediate of the leg ends. A horizontal brace 17 extends between the horizontal front and rear members 13a and 14a intermediate the ends thereof, and supports a vertical upright member 18 which extends above the top of the horizontal frame members 13, 14 and 16. A brace 19 between the left side member 16 and upright member 18 provides added rigidity thereto. The frame members may be welded, riveted, bolted or otherwise secured together by any suitable means, not shown.

Cantilevered from the upper end of the upright member 18 and extending to the right therefrom as viewed in the drawings is an arm 20 upon which is mounted a vegetable buncher designated generally by the reference numeral 21. The vegetable bunching mechanism comprises a cradle or trough 22 pivotally mounted on a pin 23 carried at the free end of the arm 20. In FIGURES 1 through 3 of the drawings the trough 22 is shown in a normal bunch supporting position, whereas in FIGURE 4 it is shown in a bunch release position. The trough or tray 22 includes a generally arcuate bottom 24 and a slanting side wall 25 adjacent the pivot side. To the right of the trough a pair of longitudinally spaced and inclined tabs 26, 26 are shown formed on a bracket 27 secured to the end of a second cantilevered arm 28 supported on an upright 29 extending from the right side member 16, which tabs serve to guide and confine the vegetable stalks on the trough 22 in the normal vegetable supporting trough position.

In the operation of the machine, described in detail hereinbelow, the stalks of vegetables, such as broccoli stalks are gripped peripherally and bunched together by the trough 22, tabs 26, 26 and a gripper member 31 pivotally mounted on a pin 32 adjacent the end of the arm 20 and extending parallel to the trough pivot pin 23. The gripper member 31 is shown comprising a generally semi-circular shape rod which may be covered with a length of flexible tubing 33 to prevent bruising of the vegetables in the vegetable gripping position thereof.

The machine includes a knife 36 having a convex sharpened cutting edge 37 for trimming the ends of the bunched vegetable stalks gripped in the above described bunching mechanism. The knife is pivotally mounted on a pin 38 extending between a pair of vertical spaced guard plates 39 and 41, which plates are interconnected along one vertical edge by a vertical base member 42. The knife guard is supported on a bracket 43 (as seen in FIGURE 1) attached to the top of the post 18 and extending rearwardly thereof. In the normal position of the knife, as illustrated in FIGURES 1, 2 and 4, the knife edge 37 is protected against inadvertent damage and the operator is shielded from the sharp cutting edge 37 by the guard plates 39 and 41. When actuated to trim the vegetable stalks, the knife is swung from the position illustrated in FIGURES 1, 2 and 4 in a clockwise direction about the pin 38 and into the position illustrated in FIGURE 3 of the drawings. The gripper member, knife and trough are all power operated in a manner now to be described.

The linkage for the gripper member 31 includes an arm 44 which is fixed to and extends from the back of the gripper member and interconnects through a pin 46 to a toggle mechanism 47 comprising a pair of levers 48 and 49 pivotally connected by a pin 51. The other end of the arm 49 is pivotally supported by a pin 52 at the upper free end of a bracket 53 which extends upwardly from a base plate 54 extending between the brace 19 and front frame member 13. Operation of the toggle mechanism is under control of a fluid cylinder 56 pivotally connected by pin 57 to a bracket 58 secured to the brace 17. A piston (not shown) is connected through a piston rod 59 to the toggle through the pin 51. The fluid cylinder is shown in its normal de-energized position in FIGURES 1, 2 and 4 wherein a tension spring 61 between the lever 49 and an arm 62 extending from the left side frame member 16a, serves to pivot the toggle members into a generally V-shape against the fluid cylinder connection. A flexible hose or tube 63 connects the gripper member fluid cylinder 56 to a T-connection 64, one arm of which is connected to a valve 66 adapted for connection through a tube 67 to a suitable source of fluid pressure, not shown. The valve is fixed to the right front leg 12 of the frame and is adapted for actuation by a valve operating lever 68 pivotally connected by pin 69 to said leg. The valve is of the type which is normally resiliently biased to an off or closed condition, and is opened by swinging the lever 68 to the right in a counter clockwise direction as viewed in FIGURES 2 through 4. When the valve is so opened, fluid pressure is supplied to the cylinder 56 and drives the piston rod 59 outwardly thereof. The toggle mechanism 47 is hereby actuated such that the levers 48, 49 form but a shallow V-shape, thereby pivoting the gripper member 31 into a closed condition as viewed in FIGURE 3.

A second flexible hose connection 71 is made to the T-connection 64 and extends therefrom to a second fluid cylinder 72 pivotally mounted on a pin 73 carried on a bracket 74 depending from the right side frame member 16. With such a fluid connection, it will be apparent that the cylinder 72 is actuated simultaneously with the cylinder 56. The piston rod 76 of the fluid cylinder 72 is pivotally connected at a pin 77 to the cutter knife 36. A tension spring 78 between the bracket 74 and lower end of the knife 36 resiliently biases the knife to its normal counterclockwisemost position between the guard members 39 and 41 against the fluid cylinder connection when the fluid pressure source is disconnected from the cylinder. When the valve 66 is opened in the manner described above to actuate the gripper member, fluid pressure is also supplied to the cylinder 72 to simultaneously actuate the same. The piston rod 76 is driven outwardly of the cylinder thereby rotating the knife 36 in a clockwise direction against the resilient bias of the spring 78 and into the position shown in FIGURE 3. When the valve 66 is returned to a closed condition upon release of the actuator lever 68, both cylinders 67 and 72 are de-energized and the gripper member 31 and knife 36 are returned by action of the springs 61 and 78 to their normal position illustrated in FIGURES 1, 2 and 4.

The actuating mechanism for the trough 22 includes an arm 81 which is fixed to and extends from the bottom of the trough and interconnects with a lever 82 through a link 83 and pin connections 84 and 86. The lever 82 is pivoted intermediate its ends on a pin 87 carried by a bracket 88 extending from the upright member 18. A fluid cylinder 89 is pivotally mounted on a pin 91 carried by the brace 19 and includes a reciprocable piston (not shown) and piston rod 92 pivotally connected to the lever 82 by a pin 93. The fluid cylinder 89 is shown in the de-energized condition in FIGURES 1, 2 and 4 wherein a tension spring 96 between the end of the lever 82 and the brace 19 serves to pivot the lever arm to its most clockwise position against the fluid cylinder connection. A flexible tube or hose 97 connects the fluid cylinder 89 to a valve 98 which in turn is connected through a tube 99 to the same source of fluid pressure, not shown, to which the supply tube 67 is connected. The valve 98 is carried on the end of an arm 101 depending from the front frame member 13 and is adapted for actuation by means of a valve operating lever 102 pivotally connected by a pin 103 to the frame member 13a. The valve is also of the type which is normally resiliently biased to an off, or closed, position and is opened by swinging the lever to the left in a clockwise direction as viewed in FIGURES 2 through 4. When the valve 98 is opened, the piston rod 92 is driven outwardly from the cylinder 89 to swing the lever 82 in a counter clockwise direction against the bias of the spring 58. As the lever 82 pivots, the linkage 83 between the lever and arm 81 secured to the trough 22 swings the trough 22 downwardly as seen in FIGURE 4. Upon release of the valve actuating lever 102, the valve 98 returns to a normal closed condition and the spring 96 returns the lever 82 and trough 22 to the position illustrated in FIGURES 1 through 3.

The operation for bunching and trimming vegetable stalks, shoots or the like although believed to be apparent from the above description of the machine, will be described briefly. A tie or ties 106 (a supply of which is conveniently located in a holder 107 attached to the machine frame by a bracket 108) are placed across the trough at a point either forwardly or rearwardly, or both, of the gripper member 31 as viewed in FIGURE 1. A wrapper 109 (a supply of which is also conveniently located in a holder 111 on the bracket 108) may be placed over the ties, across the trough, and the stalks of broccoli 112 or other vegetables to be bunched and tied are placed within the trough as shown in FIGURE 3. The tip or head ends of the stalks of vegetable face in a forward direction on the trough while the opposite ends extend beyond the rear of the trough and into the path of the knife 36. A vertical face plate 121 which is provided with a bracket 122 may be secured to the front machine frame member 13 at the front of the trough 22 against which face plate, the head or tip ends of the vegetable stalks may be butted to provide for uniform length stalks in the bunched and trimmed packs of vegetables. In FIGURES 2 and 3 of the drawings the face plate is shown broken away for clarity.

With the ties, wrapper (if desired or required) and vegetable stalks in place on the machine, the operator standing or sitting at the front of the machine, first actuates the valve lever 68 with one foot 126 to open the valve 66 whereupon the vegetable stalks are simultaneously gripped by the gripper member 31 and trimmed by the knife 36, as viewed in FIGURE 3. The trimmed ends of the broccoli fall into a sheet metal trimming and waste chute 113, the upper forward edge 114 of which is curved or flanged forward to extend beneath the knife 36 in the actuated knife position. The operator then twists the ends of the tie or ties together to secure the trimmed and bundled stalks. The valve operator 68 is then released whereupon the valve 68 closes and the gripper member 31 and knife 36 are returned by spring bias action to the position illustrated in FIGURES 1, 2 and 4. The operator, with the same motion of the foot required for releasing the valve operating lever 68, contacts the valve operator lever 102 and pivots the same to the left as viewed in FIGURES 2 through 4 to thereby open the valve 98, whereupon the trough 22 is swung downwardly as viewed in FIGURE 4, permitting the bunched, tied and trimmed vegetables 112 to drop into an inclined chute 116 which is fastened to the machine frame and extends from under the trough to a location to the right of the frame. The bunches 112 and the trimmings 117 illustrated in FIGURE 4 are for purposes of showing the path thereof in the respective chutes and do not relate to the sequence of operations above described.

The invention having been described detailed in accordance with the requirements of the patent statutes, various changes and modifications will suggest themselves to those skilled in this art and is intended that such changes and modifications shall fall within the spirit and scope of the invention as recited in the following claims.

What is claimed is as follows:

1. A vegetable bunching machine for bunching stalks of vegetables, which machine comprises a trough movable between a normal vegetable supporting position and a vegetable dumping position, the stalks of vegetables to be bunched being placed upon the trough in the vegetable supporting position thereof, a gripper member movable between an open position and vegetable clamping position for bunching the stalks of vegetables on the trough in the vegetable supporting position of the trough and clamping position of the gripper member, means for actuating the gripper member between its open and clamping positions, means for actuating the trough between its vegetable supporting and dumping positions, and means under control of an operator of the machine for controlling said actuating means whereby the machine may be stopped in either one of two conditions, one condition being wherein the trough is in a vegetable supporting position and the gripper member is in an open position, and another condition being wherein the trough is in a vegetable supporting position and the gripper member is in a vegetable clamping position.

2. The invention as recited in claim 1 including a movable trimming knife for trimming the ends of the bunched stalks on the trough, and means for actuating the knife between retracted and vegetable cutting positions, said knife actuating means also being under control of said operator controlled means whereby the knife is in the retracted position in the one stopped condition of the machine, and is in the vegetable cutting position in the other stopped condition of the machine.

3. The invention as recited in claim 2 including a generally vertically extending fixed face plate mounted a spaced distance from the trough opposite the trimming knife and against which face plate the head ends of the stalks to be bunched and trimmed may be butted.

4. A vegetable bunching machine for bunching stalks of vegetables which machine comprises, a trough movable between vegetable supporting and vegetable dumping positions, means for moving the trough between said supporting and dumping positions, said means comprising a first fluid cylinder operator operatively connected to said trough, a first valve adapted to connect the said first fluid cylinder to a source of fluid pressure, a gripper member of a generally arcuate shape which together with the trough provide means for peripherally confining the stalks of vegetables, the said gripper member being movable between open and vegetable gripping positions, means for moving the gripping member between said open and gripping positions, said last-mentioned means comprising a second fluid cylinder operator operatively connected to the said gripper member, a second valve adapted to connect the said second fluid cylinder to a source of fluid pressure, and means under control of an operator of the machine for stopping the operation of the machine in one condition wherein the trough is in a vegetable supporting position and the gripper member is in said open position, and for stopping the operation of the machine in another condition wherein the trough is in a vegetable supporting position and the gripper member is in said vegetable gripping position.

5. The invention as recited in claim 4 including a trimming knife movable between normal retracted and vegetable cutting positions, means moving the trimming knife between said retracted and cutting positions, said means comprising a third fluid cylinder operator operatively connected to said knife, and means connecting said third fluid cylinder to said second valve for substantially simultaneous actuation of the said second and third fluid cylinders, said knife being in the retracted and cutting positions when the machine is stopped in said one and another conditions, respectively.

6. The invention as recited in claim 5 including a face plate at one end of the said trough against which the head ends of the stalks to be bunched and trimmed may be butted, the stalks being confined between the said face plate and knife in the vegetable cutting position of the knife.

7. A machine for bunching and trimming generally elongated articles, which machine comprises,
   a trough movable between an article supporting position and an article dumping position, the articles to be bunched and trimmed being placed upon the trough in the article supporting position thereof with one end of the articles extending beyond one end of the trough,
   means for actuating the trough between its article supporting and dumping positions,
   a gripper member movable between open position and article clamping position for bunching the articles on the trough in the article supporting position of the trough and clamping position of the gripper member,
   means for actuating the gripper member between its open and clamping positions,
   a movable trimming knife at one end of the trough for trimming the ends of the articles extending beyond one end of the trough, and
   means for actuating the knife between retracted and article cutting positions.

8. The bunching and trimming machine as recited in claim 7 including:
   first means for receiving the trimmed ends of the articles as they are trimmed therefrom, and
   second means for receiving the trimmed articles which are dumped from the trough.

9. The bunching and trimming machine as recited in claim 7 including:
   means under control of an operator of the machine for controlling the actuating means for the gripper member, trough, and knife whereby the machine may be stopped in a first condition wherein the trough is in an article supporting position, the gripper member is in an open position, and the knife is in a retracted position, and may be stopped in a second condition wherein the trough is in an article supporting position, the gripper member is in an article clamping position, and the knife is in the article cutting position.

References Cited by the Examiner

UNITED STATES PATENTS 2,262,991  11/1941  D'Arrigo _____ 146—82
2,813,498  11/1957  Senzani _____ 146—82 X WILLIAM W. DYER, Jr., *Primary Examiner.*

W. GRAYDON ABERCROMBIE, *Examiner.*